E. A. FRITZ.
SPOTTING MOUNT FOR CAMERA DISSOLVE APPARATUS.
APPLICATION FILED OCT. 19, 1917.

1,288,555.

Patented Dec. 24, 1918.
4 SHEETS—SHEET 1.

INVENTOR.
ETHEN ALLEN FRITZ
BY
Carlos P. Griffin
ATTORNEY.

E. A. FRITZ.
SPOTTING MOUNT FOR CAMERA DISSOLVE APPARATUS.
APPLICATION FILED OCT. 19, 1917.
1,288,555. Patented Dec. 24, 1918.
4 SHEETS—SHEET 2.
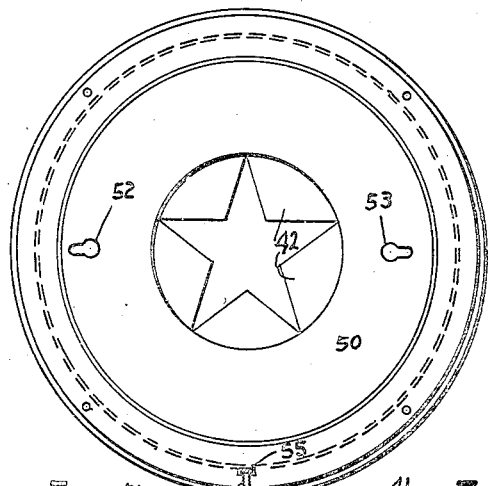
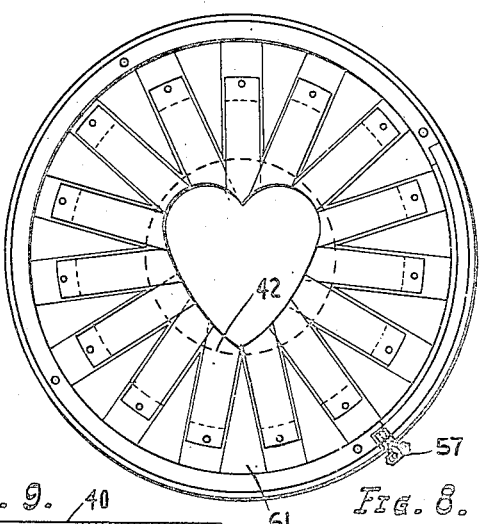
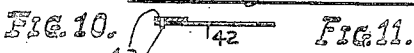
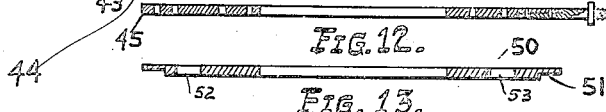
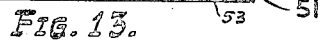
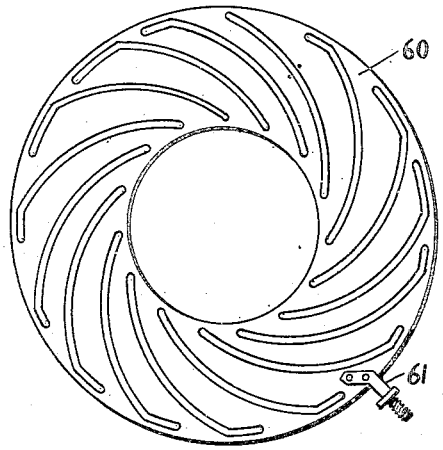
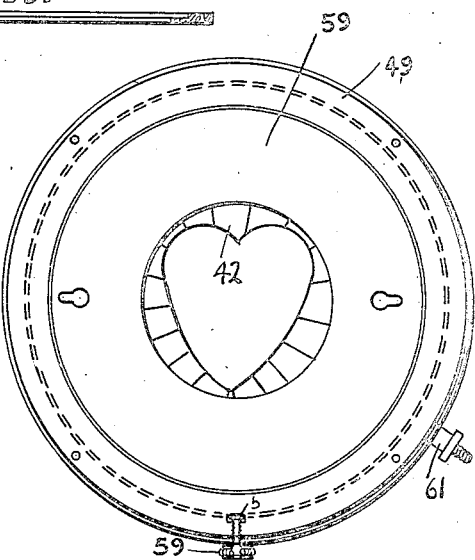
INVENTOR.
ETHEN ALLEN FRITZ
BY
Carlos P. Griffin
ATTORNEY.

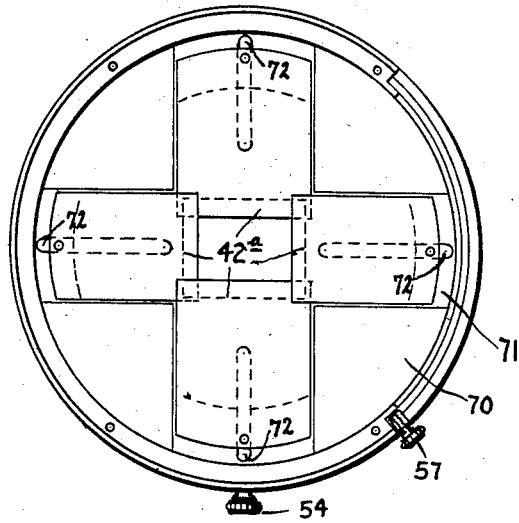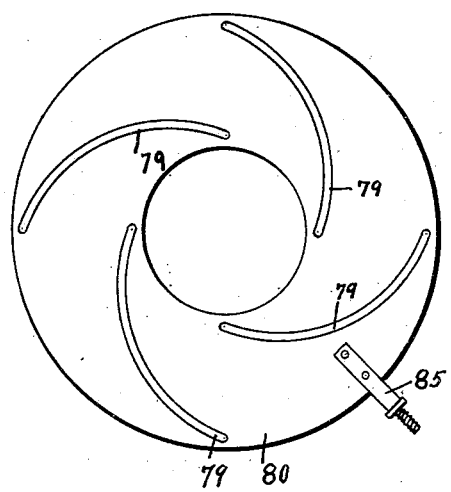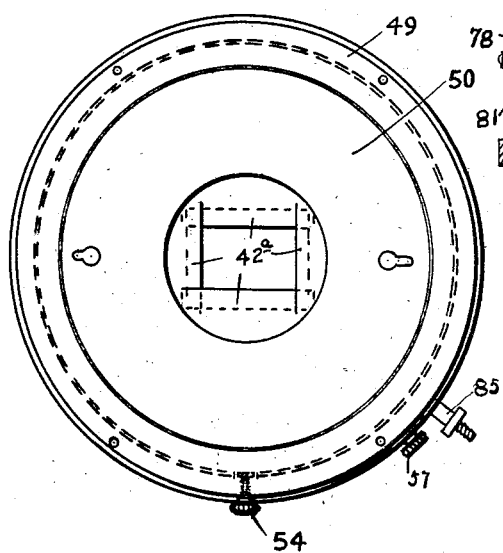

UNITED STATES PATENT OFFICE.

ETHAN ALLEN FRITZ, OF SAN FRANCISCO, CALIFORNIA.

SPOTTING-MOUNT FOR CAMERA-DISSOLVE APPARATUS.

1,288,555.　　　　　　Specification of Letters Patent.　　Patented Dec. 24, 1918.

Application filed October 19, 1917. Serial No. 197,503.

*To all whom it may concern:*

Be it known that I, ETHAN ALLEN FRITZ, a citizen of the United States, residing at San Francisco, in the county of San Francisco, State of California, have invented a new and useful Spotting-Mount for Camera-Dissolve Apparatus, of which the following is a specification in such clear and full terms as will enable those skilled in the art to construct and use the same.

This invention relates to a spotting mount for an apparatus known as a camera dissolve, which is for the purpose of producing different types of figures in motion picture camera work or in ordinary stereopticon work, or merely to cut off or deliver the light to the screen in an expanding or reducing figure from any given point of the picture to be shown.

It will be understood by those skilled in the art that it is common in showing motion pictures to start the picture with a spot of light which gradually increases in size until the entire screen is visible, and in the reverse way to take the picture off the screen by decreasing the light thereon from the outside toward the center until the light is entirely cut off.

This invention provides means whereby a star, or heart, or triangle, or rectangle or other suitable figure may be made use of in bringing the picture into view, or removing it from the screen, and to at the same time enable the operator to start or finish the light beam at any desired point on the screen.

Another object of the invention is to produce an apparatus which is capable of showing the light upon the screen with the effect of a curtain moving up or down, or of curtains moving from the center toward the side, as may be desired.

With the form of apparatus shown, various modifications of the light beam may be produced for the use of the motion picture operator with the different adjustments of the apparatus.

Figure 1:
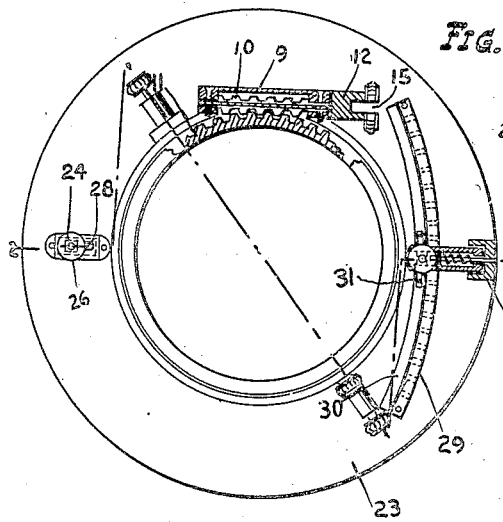
Figure 2:
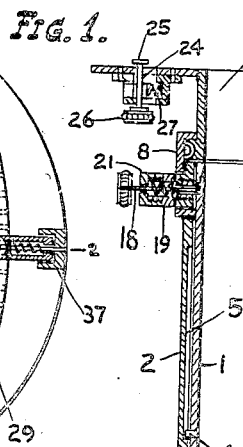
Figure 3:
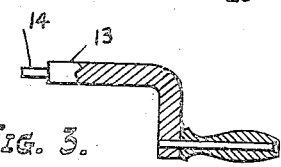
Figure 4:
Figure 5:
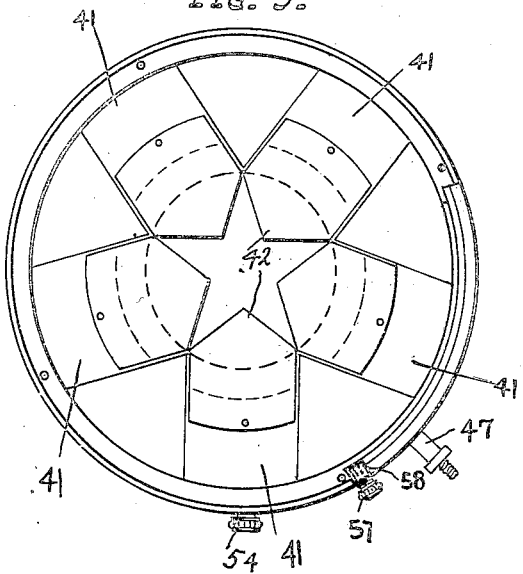
Figure 6:
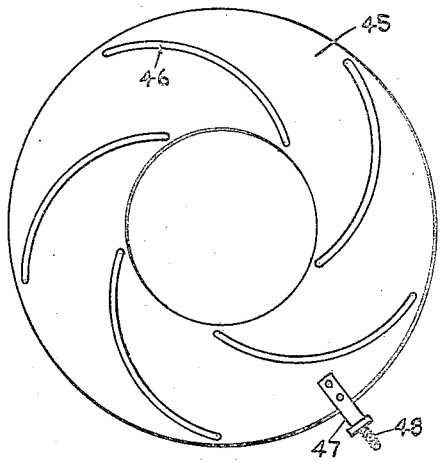
Figure 16:
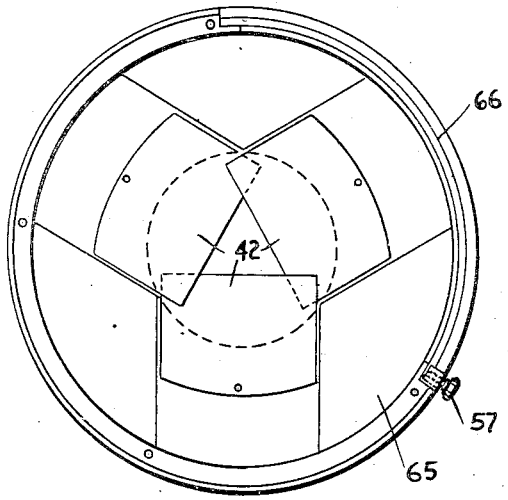
Figure 17:
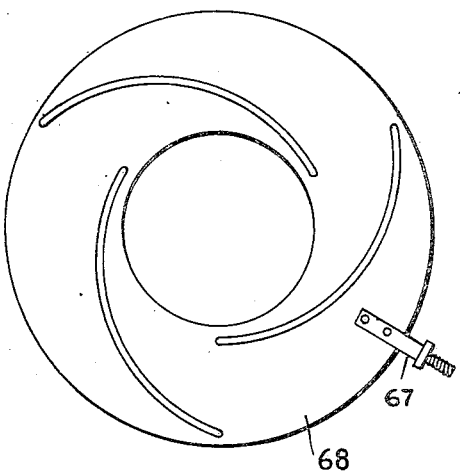
Figure 18:
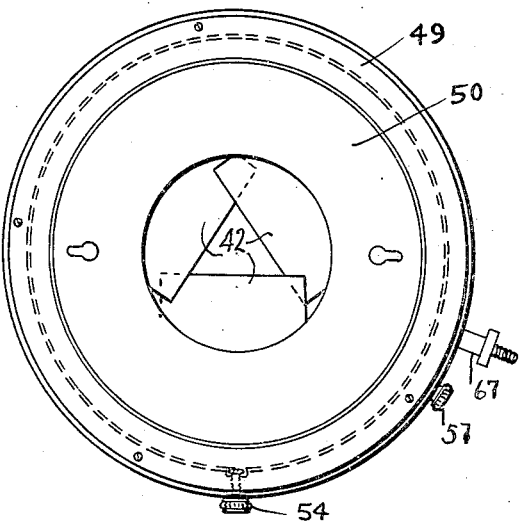

Figure 1 is a rear elevation of the dissolve mount, the tube being shown partly in section, and illustrating the manner of shifting the beginning and ending of the light beam from one side to the other of the center of the screen as may be required, Fig. 2 is a longitudinal sectional view of the focusing tube carrying the dissolve mount and showing the means for shifting it and for locking it in a given position, Fig. 3 is a view of the crank used for turning the mount axially, as will be later explained, Fig. 4 is a sectional view of the handle for operating the dissolve disks, Fig. 5 is a rear elevation of the star dissolve apparatus with the supporting and operating disks removed therefrom, Fig. 6 is a side elevation of the operating plate removed from Fig. 5 and showing the slots which cause the movement of the diaphragm plates, Fig. 7 is a back elevation of the dissolve disk showing the holes for connecting the disk to the mount on the lens tube, Fig. 8 is a rear elevation of the dissolve disk showing the diaphragm for producing a heart dissolve, and with the operating disks and supporting disks removed therefrom, Fig. 9 is a transverse sectional view of the disk shown in Fig. 8 with the diaphragms removed therefrom, Fig. 10 is an edge view in section of one of the diaphragm plates, Fig. 11 is a sectional view of the slotted operating plate used in connection with Fig. 8, Fig. 12 is a central sectional view in edge elevation of the supporting plate for the dissolve disk, Fig. 13 is a central sectional view in edge elevation of the plate which secures the diaphragms, operating plate and supporting plate together, Fig. 14 is a side elevation of the operating plate used in conjunction with Fig. 8, showing the grooves for the operation of the diaphragm plates, Fig. 15 is a back view in side elevation of the dissolve disk carrying the heart shaped diaphragms, Fig. 16 is a view in side elevation of the dissolve disk carrying the diaphragms for producing the triangular dissolve effect with the retaining plates removed, Fig. 17 is a view of the operating disk used in connection with Fig. 17 removed and illustrating the slots for the operation of the diaphragms, Fig. 18 is a back elevation of the dissolve disk carrying the triangular diaphragms, Fig. 19 is a back elevation of the dissolve disk carrying the diaphragms for producing the curtain and rectangular effects, Fig. 20 is a side elevation of the operating disk used in conjunction with the apparatus shown in Fig. 19 and showing the slots for operating the diaphragms, Fig. 21 is a back elevation of the diaphragm disk shown in Fig. 19 and illustrating the supporting plate, Fig. 22 is an enlarged view of the locknut and stop screw, Fig. 23 is a side elevation, with the stop block shown in section, of the screw for stopping the dissolve action at any given point, Fig. 24 is a side elevation of a screw for locking the disk support, plate and disk in a given position when once set, Fig. 25 is a transverse sectional view of the front plate within which the diaphragm and supporting plates are mounted, Fig. 26 is a sectional view in edge elevation of one of the diaphragm plates used in Fig. 21, Fig. 27 is a transverse sectional view of the slotted operating plate, the line of section being shown at 27—27 Fig. 20.

The numeral 1 indicates the focusing tube which is slidably mounted within a tube 2, which is fastened to any suitable part of the camera front or fixture of the moving picture camera by means of the flange 3. The tube 1 is provided with a pin 4 which moves in a slot 5 in the tube 2 to limit the movement of the tube 1. A thumb screw 6 enables the focusing tube to be locked in any desired position. At the front of the focusing tube there is a dissolve mount tube 7. This tube is revolubly mounted with respect to the tube 1, and is secured thereto by means of the flange ring 8, which ring has a casing 9 at its upper end to receive a worm 10 revoluble therein for the purpose of adjusting the position of the tube 7. The flange of the tube 7, which is held under the flange of the ring 8, is provided with teeth as indicated at 11 which mesh with the threads of the worm 10, and said worm is rotated by means of the thumb screw 12, or if it is to be rotated a considerable amount the hand crank 13 may be used, in which event the squared portion 14 is inserted in the slot 15 of the thumb screw.

The flange ring 8 is threaded on a ring 16 which surrounds the outer end of the tube 1 and which is held in place thereon by means of the snap pins 17 and 18, said pins being pressed into position shown in Fig. 2 by means of the surrounding helical springs 19 and 20, but whenever it is desired to disconnect the ring 16 from the tube 1 the pins 17 and 18 may be moved outwardly in their casings 21, 22 to release them from said tube and thereby permit the removal of the mount, and it is with respect to the ring 16 that the worm wheel rotates the short tube 7. The short tube 7 has a wide flange 23 at its upper end, which flange carries a pin 24 having an enlarged head 25, and which pin may be locked in any given position by means of the thumb nut 26 threaded thereon. A spring 27 bears upon the pin 24 and holds it normally in the position shown in Fig. 1, although by reason of the radially extending slot 28 in the face of the flange 23, said pin may be moved radially with respect to the tube 7.

At the opposite side of the flange 23, there is a cross bar 29 provided with a plurality of holes, and said cross bar has the same curvature as the slot 30 which has its center at the pin 24. The flange 23 has a slot within said bar as shown at 30, and a block 31 is slidable therein, which block also carries a pin 32, said pin having a head 33 to engage the back of the dissolve supporting plate.

The block 31 is hollow to receive a pin 34 around which is a small helical spring 35 bearing upon a flange 36 of said pin and tending to hold it in engagement with the bar 29. This pin may be moved outwardly out of engagement with said bar by means of the head 37 attached to its outer end. It is therefore possible to move the pin 32 to any one of a number of positions along the slot 30, and to lock it in that position by means of the pin 34.

The dissolve apparatus proper consists of a plate 40 having suitable radially extending recesses 41 therein to receive the plates 42 and bars 43, which make up the iris diaphragm of the dissolve apparatus. Each pair of plates 42, 43 is suitably connected together, and there is a pin 44 projecting from each pair which serves to operate the plates in the proper time, as the slotted cam plate is revolved to produce the desired figure.

In the first instance, a dissolve apparatus having five plates and producing the star shape, is made use of.

It is to be observed at this point that the several plates making up the dissolve apparatus are all shown in cross section in Figs. 9 to 13 for the star, heart and triangle figures, although, of course, the slotted plate is provided with a different number of slots in each instance when the plates 42 are inserted in position, the slotted cam disk 45 is placed thereover, the pins 44 then engaging the slots 46 in said disk. This disk has an arm 47 secured thereto and threaded at 48 to receive the operating handle 49'. A ring 49 retains another ring 50 which holds the plates 42 and cam ring 45 in place, and the ring 50 has a scarf joined at 51 in order to reduce the thickness of the apparatus. This ring is also provided with two holes 52, 53, which enable the dissolve apparatus to be detachably secured upon the pins 24, 32 of the mount. Whereupon the dissolve apparatus may be rotated to bring the dissolve figure to any desired position of the light beam, and when rotated to a particular position the dissolve apparatus is fixed in that position by means of the thumb screw 54 which bears upon a block 55 in turn bearing upon the edge of the ring 51 to lock it and the ring 49 together. The desired figure effect is produced by giving a suitable shape to the ends of the plates 42, and by moving them away from the center of the figure or toward the center of the figure at suitable rates to produce the desired figure. In the mechanism shown in Figs. 5, 6 and 7 there are five of the slots 46, one for each plate 42, and the slots are all precisely alike thereby causing the plates 42 to move away from the center or toward the center all in the same time, and as soon as it may happen that it is desired to reduce the figure or to expand it, as the case may be, to a given amount only, the arm 47 may be stopped in its travel along the slot 56 by means of the thumb screw 57, the latter being threaded into a block 58, which is capable of moving circumferentially around the outside of the ring or disk 40.

It is to be observed that, with the assistance of the adjustment along the curved bar 29, the rotation of the mount tube 7 and the rotation of the disk carrying the dissolve diaphragm plates, it is possible to have the figure begin or end at substantially any point in the light beam proceeding from the lens.

It is also to be observed that rough adjustments in rotation may be made with the use of the plate 50, but that finer adjustments after that plate has been locked in position are made with the assistance of the worm 10.

Figs. 8, 14 and 15 show views of the dissolve apparatus in which the dissolve figure is a heart. This apparatus is substantially identical with the apparatus shown in Figs. 5, 6 and 7, except that a different number of plates are used, and said plates are different shaped at their outer ends to produce the desired effect. In addition to which, the grooves of the plate 60 are all differently shaped to move the diaphragm plates toward the center, or away from the center, at such rates as may be necessary to produce a uniformly increasing or diminishing heart shaped figure from the beam of light upon the screen. In this instance, the plates 42' are mounted upon a disk or ring 61 with fifteen grooves to receive said plates. This plate is also provided with the stop thumb screw 57, and the disk 60 has an arm 61 connected therewith to which the handle 49 may be connected for the opening and closing of the diaphragm plates. This plate also has the adjusting plate 50 at its back, and the ring 49 is precisely the same as the ring used with the previous form of the invention.

This apparatus is also provided with the locking thumb screw 54 to hold the apparatus in a fixed position with respect to the plate 50.

Figs. 16, 17 and 18 show a slightly modified form of the apparatus in which a triangle figure is produced. In this form of the apparatus, the plate 65 is provided with a longer slot 66 in which the arm 67 of the slotted ring 68 moves; this being necessary to give the plates the desired movement in a suitable time. One of the stop thumb screws 57 is also used in conjunction with this form of the invention, and the plates 42'' are three in number.

In this form of the invention, the ring 49 is made use of precisely as in the previous forms of the invention, as well as the ring 50 and the stop screw 54 is made use of to lock the dissolve apparatus in a fixed position with respect to the plate 50.

In Figs. 19 to 27 there is shown the parts making up the dissolve apparatus to produce the so called rectangle dissolve or curtain effect dissolve. In these figures, the numeral 70 indicates the plate which is provided with four grooves 71 to receive the dissolve plates 42ª, said plates being four in number and operating at right angles to each other. The plate 70 is provided with the stop thumb screw 57 to enable the operator to stop the dissolve at any given point, and it also has the stop thumb screw 54 to enable the dissolve apparatus to be locked in any given position with respect to the plate 50.

The front of the plate 70 is provided with four radially extending slots 72 and each of the bars 73 has a short threaded tube 74 rigidly connected therewith and extending at right angles thereto through the slot 72. The tube 74 has a thumb nut 75 thereon in order to lock the plate 42ª in any given position, and in order to operate said plates there is a pin 76 which extends through the tube 74 and is connected with a thumb nut 77 at its outer end. The thumb nut 77 is provided with lugs 78 which are normally seated in slots in the top of the tube 74 whereupon the pin 76 will reach through the plate 73 into the cam grooves 79 of the plate 80, and thereby enable the plate 42ª to close the aperture in the plate 70 according to the law of the cam groove 79. A spring 81 surrounding the pin 76 holds the pin 76 normally in engagement with the grooves of the plate 80, and when it is desired to stop the plate at any given point the pin is lifted by means of the thumb nut 77 and turned slightly to hold it out of engagement with said plate, whereupon it may be locked in that adjustment by means of the thumb nut 75, said nut bearing upon the plate 70.

It will be noted that there are four tubes 74, one for each plate 42, so that any one of the plates may be used to close the entire aperture or any two or all together may be used as deemed desirable. This form of the apparatus is especially advantageous for the so called double exposure work in which event the picture is taken from a given position with one of the plates 42 extending a portion of the distance across the aperture in the plate 70.

After a suitable number of pictures have been taken, or after one picture has been taken, if desired the plate can be reëxposed with the opposite plate 42ª extending to the same line with the other one so extended, whereupon the second exposure may be made.

The plate 80 is operated by means of the arm 85 on which the handle 49' may be screwed.

The operation of the apparatus will be clear from the preceding description, but it is to be noted that the tube 2 may be mounted over any suitable lens and any one of the dissolve plates may be mounted thereon. If the operator desires to use the star dissolve, he may place it on the supports, or he may use the heart triangle or square at will.

It will be clear also that while the star, triangle and heart dissolves may be used to produce only a single figure with the finish or opening at any point of the screen, it is possible to produce a plurality of effects with the dissolve shown in Figs. 19 to 21. With the form of the invention shown in these latter figures, the light thrown upon the screen may be brought into view, or cut off therefrom either from the top or bottom thereof, or from the sides by simply fastening the desired plates 42 out of use singly or in pairs, or all except one may be fastened out of use.

Having thus described my invention what I claim as new and desire to secure by Letters Patent of the United States is as follows, express reservation being made of permissible modifications.

1. A dissolve apparatus for motion picture camera work comprising a focusing tube, a dissolve mount tube carried by the focusing tube and revoluble with respect thereto, a dissolve apparatus mounted upon the latter tube, and means to shift the dissolve apparatus with respect to the tube upon which it is mounted whereby the beginning or ending of the light beam upon a screen may be shifted to any portion of the screen.

2. A dissolve apparatus for cameras consisting of a focusing tube, a revoluble tube mounted thereon, and a dissolve apparatus detachably and adjustably supported by the revoluble tube whereby the beginning or the ending of a light beam upon a screen may be shifted to any point thereof.

3. A dissolve apparatus for cameras consisting of a plate having a plurality of radially extending shallow channels, a series of diaphragm plates in said channels, a grooved cam plate adjacent the diaphragm plates and adapted to extend or retract the diaphragm plates, and a plate revoluble with respect to the diaphragm plates for the support of the entire apparatus.

4. A dissolve apparatus for cameras comprising a revoluble focusing tube, a carrier for a series of diaphragm plates, means to detachably connect the carrier to the focusing tube including means to shift the diaphragm carrier laterally with respect to the focusing tube, and means to rotate the carrier with respect to the focusing tube in any of its adjusted positions.

5. A dissolve apparatus for cameras consisting of a revoluble focusing tube, a diaphragm carrier, means to detachably connect the diaphragm carrier to the focusing tube, means to rotate the diaphragm carrier with respect to the focusing tube, and means whereby the diaphragm carrier may be moved laterally with respect to the focusing tube, and means to open and close the diaphragm at will.

6. A dissolve apparatus for cameras consisting of a plate having a plurality of radially extending channels, a series of diaphragm plates in said channels, a cam plate having curved grooves, pins carried by the diaphragm plates extending into the grooves of the cam plate for the operation of the diaphragm plates, a supporting plate revoluble with respect to the diaphragm plates, means to detachably connect said supporting plate with a lens tube, and means to move the dissolve apparatus laterally with respect to the lens tube.

7. A dissolve apparatus for cameras comprising a plate having a plurality of radially extending shallow channels, a series of diaphragm plates in said channels adapted to produce a desired figure when moved toward a common center, a supporting plate revoluble with respect to the diaphragm plates, means to detachably connect said supporting plate with a focusing tube, means to move the supporting plate and diaphragm plates laterally with respect to the focusing tube, and means to extend and retract the diaphragm plates at will.

8. A dissolve apparatus for canvas consisting of a plate having a plurality of radially extending shallow channels, a series of diaphragm plates in said channels, pins carried by each diaphragm plate for the operation thereof, means to retract said pins, and a revoluble cam plate to retract or extend the diaphragm plates.

9. A dissolve apparatus for cameras consisting of a plate having a plurality of radially extending shallow channels, a diaphragm plate in each of said channels, a pin carried by each diaphragm plate for the operation thereof, means to retract the pin to lock the pin in the retracted position at will, means to lock the diaphragm plate in any given position, and a slotted cam plate adapted to retract the diaphragm plates.

10. A dissolve apparatus for cameras having a plurality of radially extending shallow channels, a diaphragm plate in each of said channels, an operating pin movably connected with said plate, means whereby the pin may be retracted and locked in the retracted position, means to set each of the diaphragm plates in any desired position, means to extend or retract the diaphragm plates at will, and means to detachably connect the plate carrying the diaphragm plates with the lens tube of a camera.

ETHAN ALLEN FRITZ.